United States Patent
Okuda (10) Patent No.: US 9,315,194 B2
(45) Date of Patent: Apr. 19, 2016

(54) LOW-LEVEL CONSCIOUSNESS DETERMINATION SYSTEM

(75) Inventor: Yuji Okuda, Susono (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 45 days.

(21) Appl. No.: 14/385,350

(22) PCT Filed: Mar. 28, 2012

(86) PCT No.: PCT/JP2012/058232
§ 371 (c)(1),
(2), (4) Date: Sep. 15, 2014

(87) PCT Pub. No.: WO2013/145183
PCT Pub. Date: Oct. 3, 2013

(65) Prior Publication Data
US 2015/0070159 A1    Mar. 12, 2015

(51) Int. Cl.
*G08B 23/00* (2006.01)
*B60W 40/08* (2012.01)
*B60W 50/12* (2012.01)
*G08B 21/06* (2006.01)

(52) U.S. Cl.
CPC .............. *B60W 40/08* (2013.01); *B60W 50/12* (2013.01); *G08B 21/06* (2013.01); *B60W 2040/0818* (2013.01); *B60W 2530/14* (2013.01); *B60W 2540/18* (2013.01); *B60W 2550/146* (2013.01)

(58) Field of Classification Search
CPC .............. B60W 40/08; B60W 50/12; B60W 2040/0818; B60W 2530/14; B60W 2540/18; B60W 2550/146; G08B 21/06

USPC .......................................... 340/439, 575, 576
See application file for complete search history.

(56) References Cited

U.S. PATENT DOCUMENTS 4,594,583 A * 6/1986 Seko .................... A61B 5/18
340/576
4,611,199 A * 9/1986 Seko .................... A61B 5/18
340/576

(Continued)

FOREIGN PATENT DOCUMENTS

JP    06-156113 A    6/1994
JP    10-166891 A    6/1998

OTHER PUBLICATIONS

International Search Report of PCT/JP2012/058232 dated Jun. 26, 2012 [PCT/ISA/210].

*Primary Examiner* — Eric Blount
(74) *Attorney, Agent, or Firm* — Sughrue Mion, PLLC (57) ABSTRACT

The low-level consciousness determination system includes curved road determination means for determining whether a road on which the vehicle is traveling is a curved road and determining whether the vehicle is traveling on the outside of the curved road or on the inside of the curved road when the road is the curved road, threshold value setting means for setting different sudden steering determination threshold values when the curved road determination means determines that the road is not the curved road, when the curved road determination means determines that the vehicle is traveling on the outside of the curved road, and when the curved road determination means determines that the vehicle is traveling on the inside of the curved road, and sudden steering detection means for detecting the sudden steering on the basis of the threshold values set by the threshold value setting means after the non-steering state is detected.

5 Claims, 4 Drawing Sheets

(56) References Cited

U.S. PATENT DOCUMENTS

| | | | |
|---|---|---|---|
| 7,079,927 B1 * | 7/2006 | Tano | G01C 21/26 701/25 |
| 7,890,231 B2 * | 2/2011 | Saito | B62D 1/28 701/41 |
| 8,519,853 B2 * | 8/2013 | Eskandarian | A61B 5/6887 340/575 |
| 9,073,576 B2 * | 7/2015 | Lee | B62D 1/286 |
| 2012/0212353 A1 * | 8/2012 | Fung | B60K 28/06 340/576 |

* cited by examiner

LOW-LEVEL CONSCIOUSNESS DETERMINATION SYSTEM

CROSS-REFERENCE TO RELATED APPLICATIONS

This is a National Stage of International Application No. PCT/JP2012/058232 filed Mar. 28, 2012, the content of all which is incorporated herein by reference in its entirety.

TECHNICAL FIELD

The present invention relates to a low-level consciousness determination system that detects sudden steering after a non-steering state and determines a consciousness-degraded state of a driver who drives a vehicle.

BACKGROUND ART

A system has been developed which determines the consciousness-degraded state of the driver of the vehicle due to, for example, fatigue, drowsiness, and inattentive driving and outputs a warning to the driver. As a method for determining the consciousness-degraded state, for example, there is a method which detects, as an abnormal behavior, a unique steering pattern that appears in the consciousness-degraded state. Patent Literature 1 discloses a technique which detects the speed of the vehicle or a steering angle, determines that the driver has fallen asleep at the wheel when sudden steering is detected after a non-steering state is maintained for a predetermined period of time and the steering pattern belongs to a reference pattern, and operates a warning generation device.

CITATION LIST

Patent Literature

[Patent Literature 1] Japanese Unexamined Patent Application Publication No. 6-156113
[Patent Literature 2] Japanese Unexamined Patent Application Publication No. 10-166891

SUMMARY OF INVENTION

Technical Problem

The sudden steering after the non-steering state means sudden correction steering which is performed by the driver in order to avoid the deviation of the vehicle from the lane when the host vehicle deviates from the lane due to the non-steering state of the driver caused by the degradation of consciousness. The sudden steering (correction steering) is detected by, for example, comparison between a threshold value and a steering angular speed corresponding to the steering operation of the driver. The steering angular speed during sudden steering varies depending on a traveling environment. There is a traveling environment in which the steering angular speed during sudden steering decreases, in addition to the traveling environment in which the steering angular speed during sudden steering increases. Therefore, when the threshold value has the same value in any traveling environment, detection errors are likely to occur depending on the traveling environments. For example, sudden steering may not be detected even though it actually occurs, or sudden steering may be detected even though it does not actually occur.

An object of the invention is to provide a low-level consciousness determination system which can detect sudden steering after a non-steering state with high accuracy.

Solution to Problem

According to the invention, there is provided a low-level consciousness determination system that detects sudden steering after a non-steering state and determines a consciousness-degraded state of a driver who drives a vehicle. The low-level consciousness determination system includes curved road determination means for determining whether the vehicle is traveling on the outside of a curved road or on the inside of the curved road when a road on which the vehicle is traveling is a curved road, threshold value setting means for setting different sudden steering determination threshold values when the curved road determination means determines that the vehicle is traveling on the outside of the curved road and when the curved road determination means determines that the vehicle is traveling on the inside of the curved road, and sudden steering detection means for detecting the sudden steering on the basis of the threshold values set by the threshold value setting means after the non-steering state is detected.

In the low-level consciousness determination system, when the road on which the vehicle is traveling is a curved road as the traveling environment of the vehicle, the curved road determination means determines whether the vehicle is traveling on the outside of the curved road or on the inside of the curved road. The traveling environment of the vehicle is mainly divided into a curved road and a straight road. In the case of the curved road, steering for turning the vehicle along the curve is required. In the curved road, a steering operation for lane keeping is more difficult than that in the case of a straight road and a large amount of correction steering (for example, a higher steering speed and a larger amount of steering than those when the vehicle is traveling on the straight road) is required. When the road is a curved road, the traveling environment of the vehicle includes an environment in which the vehicle is traveling on the outside of the curved road and an environment in which the vehicle is traveling on the inside of the curved road. When the vehicle is traveling on the outside of the curved road, the current steering is insufficient to turn the vehicle along the curve and a large amount of correction steering (for example, a higher steering speed and a larger amount of steering than those when the vehicle is traveling on the inside of the curve) is required to return the vehicle to the center of the lane (to avoid the vehicle from deviating from the lane). When the vehicle is traveling on the inside of the curved road, the current steering is too large to turn the vehicle along the curve and the amount of correction steering required to return the vehicle to the center of the lane may be less than that when the vehicle is traveling on the outside of the curved road (for example, a lower steering speed and a smaller amount of steering than those when the vehicle is traveling on the outside of the curve). Therefore, when sudden correction steering is performed in order to avoid the deviation of the vehicle from the lane after a non-steering state is maintained due to the degradation of the consciousness of the driver, the amounts of sudden correction steering are different when the vehicle is traveling on the outside of the curved road and when the vehicle is traveling on the inside of the curved road. Therefore, in the low-level consciousness determination system, the threshold value setting means sets different sudden steering determination threshold values when the vehicle is traveling on the outside of the curved road and when the vehicle is traveling on the inside of the curved road. In the low-level consciousness determination system, the sudden steering detection means determines whether sudden steering occurs on the basis of the threshold values which are set in correspondence with the traveling environments, after the non-steering state (including a state in which the amount of correction steering is small) is detected, and determines that the driver is in the consciousness-degraded state when the sudden steering is detected. As such, the low-level consciousness determination system changes the sudden steering determination threshold value when the vehicle is traveling on the outside of the curved road and when the vehicle is traveling on the inside of the curved road as the traveling environment of the vehicle. Therefore, it is possible to detect sudden steering after a non-steering state with high accuracy and to determine the consciousness-degraded state of the driver with high accuracy.

In the low-level consciousness determination system according to the above-mentioned aspect of the invention, when the vehicle is traveling on the outside of the curved road, the threshold value setting means may set the sudden steering determination threshold value to be greater than that when the vehicle is traveling on the inside of the curved road.

As described above, when the vehicle is traveling on the outside of the curved road, the amount of correction steering required to return the vehicle to the center of the lane is more than that when the vehicle is traveling on the inside of the curved road. Therefore, the degree of sudden steering increases. In the low-level consciousness determination system, when the vehicle is traveling on the outside of the curved road, the threshold value setting means sets the sudden steering determination threshold value to be greater than that when the vehicle is traveling on the inside of the curved road. As a result, in the low-level consciousness determination system, it is possible to detect sudden steering with high accuracy, using the threshold values suitable for each traveling position when the vehicle is traveling on the curved road.

According to the invention, there is provided a low-level consciousness determination system that detects sudden steering after a non-steering state and determines a consciousness-degraded state of a driver who drives a vehicle. The low-level consciousness determination system includes curved road determination means for determining whether a road on which the vehicle is traveling is a curved road, threshold value setting means for setting different sudden steering determination threshold values when the curved road determination means determines that the road is not the curved road and when the curved road determination means determines that the road is the curved road, and sudden steering detection means for detecting the sudden steering on the basis of the threshold values set by the threshold value setting means after the non-steering state is detected.

In the low-level consciousness determination system, the curved road determination means determines whether the road on which the vehicle is traveling is a curved road or not as the traveling environment of the vehicle. As described above, the traveling environment of the vehicle includes a curved road and a straight road. In the case of the curved road, a steering operation for lane keeping is more difficult than that in the straight road and a large amount of correction steering is required. When sudden correction steering is performed in order to avoid the deviation of the vehicle from the lane after a non-steering state is maintained due to the degradation of the consciousness of the driver, the amounts of sudden correction steering are different when the vehicle is traveling on the straight road and when the vehicle is traveling on the curved road. Therefore, in the low-level consciousness determination system, the threshold value setting means sets different sudden steering determination threshold values when the road is determined to be a curved road and when the road is determined not to be a curved road (the vehicle is traveling on a straight road). In the low-level consciousness determination system, the sudden steering detection means determines whether sudden steering occurs on the basis of the threshold values which are set in correspondence with the traveling environments after the non-steering state is detected, and determines that the driver is in the consciousness-degraded state when the sudden steering is detected. As such, the low-level consciousness determination system changes the sudden steering determination threshold value when the road is a curved road and when the road is not a curved road as the traveling environment of the vehicle. Therefore, it is possible to detect sudden steering after a non-steering state with high accuracy and to determine the consciousness-degraded state of the driver with high accuracy.

In the above-mentioned low-level consciousness determination system according to the invention, when the vehicle is traveling on the curved road, the threshold value setting means may set the sudden steering determination threshold value to be greater than that when the vehicle is not traveling on the curved road.

As described above, when the vehicle is traveling on the curved road, the amount of correction steering required to return the vehicle to the center of the lane is more than that when the vehicle is traveling on the straight road. Therefore, the degree of sudden steering increases. In the low-level consciousness determination system, when the vehicle is traveling on the curved road, the threshold value setting means sets the sudden steering determination threshold value to be greater than that when the vehicle is not traveling on the curved road (when the vehicle is traveling on the straight road). As a result, in the low-level consciousness determination system, it is possible to detect sudden steering with high accuracy, using the threshold values suitable for the curved road and the straight road.

According to the invention, there is provided a low-level consciousness determination system that detects sudden steering after a non-steering state and determines a consciousness-degraded state of a driver who drives a vehicle. The low-level consciousness determination system includes curved road determination means for determining whether a road on which the vehicle is traveling is a curved road and determining whether the vehicle is traveling on the outside of the curved road or on the inside of the curved road when the road is the curved road, threshold value setting means for setting different sudden steering determination threshold values when the curved road determination means determines that the road is not the curved road, when the curved road determination means determines that the vehicle is traveling on the outside of the curved road, and when the curved road determination means determines that the vehicle is traveling on the inside of the curved road, and sudden steering detection means for detecting the sudden steering on the basis of the threshold values set by the threshold value setting means after the non-steering state is detected.

In the low-level consciousness determination system, the curved road determination means determines whether the road on which the vehicle is traveling is a curved road or not as the traveling environment of the vehicle. When the road is a curved road, the curved road determination means determines whether the vehicle is traveling on the outside of the curved road or on the inside of the curved road. As described above, the traveling environment of the vehicle is mainly divided into a curved road and a straight road. In the case of the curved road, a steering operation for lane keeping is more difficult than that in the case of a straight road and a large amount of correction steering is required. As described above, in the case of the curved road, the traveling environment of the vehicle includes an environment in which the vehicle is traveling on the outside of the curved road and an environment in which the vehicle is traveling on the inside of the curved road. When the vehicle is traveling on the outside of the curved road, a larger amount of correction steering is required to return the vehicle to the center of the lane. When the vehicle is traveling on the inside of the curved road, the amount of correction steering required to return the vehicle to the center of the lane may be less than that when the vehicle is traveling on the outside of the curved road. Therefore, when sudden correction steering is performed in order to avoid the deviation of the vehicle from the lane after a non-steering state is maintained due to the degradation of the consciousness of the driver, the amounts of sudden correction steering are different when the vehicle is traveling on the straight road, when the vehicle is traveling on the outside of the curved road, and when the vehicle is traveling on the inside of the curved road. Therefore, in the low-level consciousness determination system, the threshold value setting means sets different sudden steering determination threshold values when it is determined that the road is not a curved road (the vehicle is traveling on the straight road), when it is determined that the vehicle is traveling on the outside of the curved road, and when it is determined that the vehicle is traveling on the inside of the curved road. In the low-level consciousness determination system, the sudden steering detection means determines whether sudden steering occurs on the basis of the threshold values which are set in correspondence with the traveling environments, after the non-steering state is detected, and determines that the driver is in the consciousness-degraded state when the sudden steering is detected. As such, the low-level consciousness determination system changes the sudden steering determination threshold value when the road is not a curved road, when the vehicle is traveling on the outside of the curved road, and when the vehicle is traveling on the inside of the curved road as the traveling environment of the vehicle. Therefore, it is possible to detect sudden steering after a non-steering state with high accuracy and to determine the consciousness-degraded state of the driver with high accuracy.

Advantageous Effects of Invention

According to the invention, the sudden steering determination threshold value is changed depending on whether the road is a curved road or not or whether the vehicle is traveling on the outside of the curved road or on the inside of the curved road, as the traveling environment of the vehicle. Therefore, it is possible to detect sudden steering after a non-steering state with high accuracy and to determine the consciousness-degraded state of the driver with high accuracy.

DESCRIPTION OF EMBODIMENTS

Hereinafter, an embodiment of a low-level consciousness determination system according to the invention will be described with reference to the drawings. In the drawings, the same or equivalent components are denoted by the same reference numerals and the description thereof will not be repeated.

In this embodiment, the invention is applied to the low-level consciousness determination system which determines whether a driver is in a consciousness-degraded state and issues a warning when the driver is in the consciousness-degraded state. The low-level consciousness determination system according to this embodiment determines whether there is an abnormal behavior (abnormality in the behavior of a vehicle in response to a steering operation of the driver) using a steering angular speed and determines that the driver is in the consciousness-degraded state when there is an abnormal behavior.

The low-level consciousness determination system according to this embodiment may operate, for example, when an ACC power supply is turned on or when an engine starts. Alternatively, predetermined operation conditions or cancellation conditions may be set. For example, the system operates when the speed of the vehicle is equal to or greater than a predetermined value as the operation conditions. As the cancellation conditions, the system may be temporarily stopped, for example, when a left or right indicator switch is turned on in order to prevent the operation of the system while the driver is changing lanes, or the system may be temporarily stopped in response to the operations of the driver other than the operation of the indicator.

Figure 1:
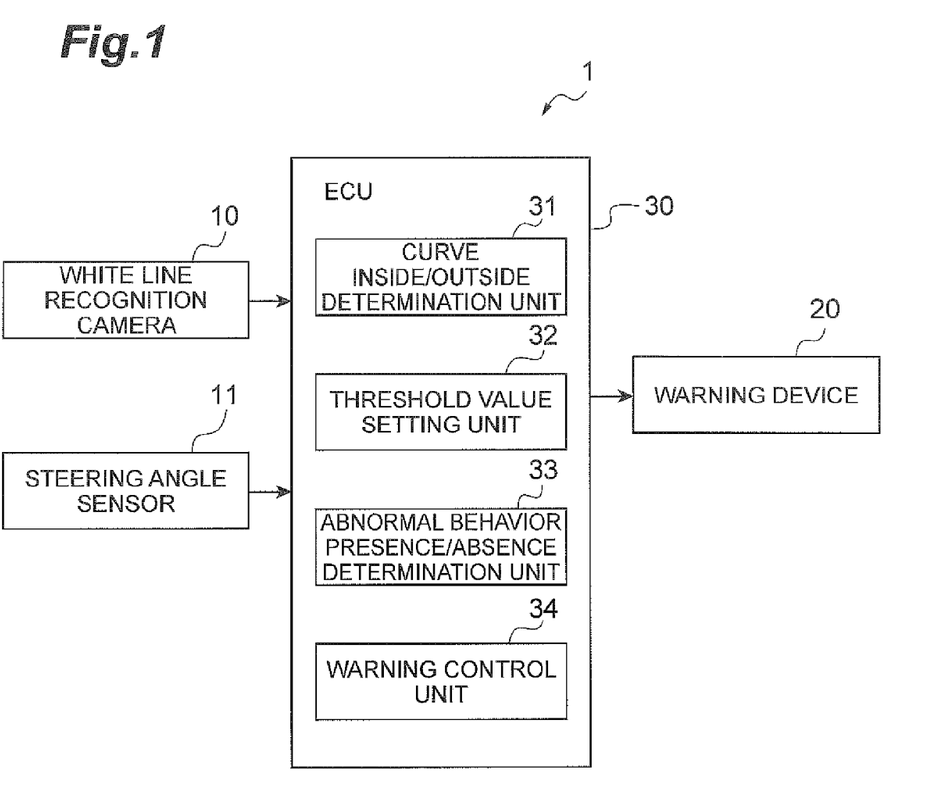
FIG. 1 is a diagram illustrating the structure of a low-level consciousness determination system according to an embodiment.

A low-level consciousness determination system 1 according to this embodiment will be described with reference to FIG. 1. FIG. 1 is a diagram illustrating the structure of the low-level consciousness determination system.

The low-level consciousness determination system 1 determines whether sudden steering occurs after a non-steering state (including a small amount of correction steering) as the abnormal behavior. In particular, the low-level consciousness determination system 1 sets a sudden steering determination threshold value according to the traveling environments of the vehicle (a straight road, the outside of a curved road, and the inside of the curved road) in order to determine sudden steering with high accuracy according to the traveling environments.

When the consciousness of the driver is degraded due to, for example, fatigue, drowsiness, and inattentive driving, the driver does not steer the vehicle or the amount of correction steering is reduced. In some cases, the vehicle deviates from the center of the lane and departs from the lane. In particular, in the case of a curved road, steering for turning the vehicle along the curve is required. Therefore, a steering operation for lane keeping is more difficult than that in the case of a straight road and the vehicle is likely to deviate from the lane. The driver performs a sudden correction steering operation for returning the vehicle to the center of the lane when being aware of the deviation of the vehicle from the lane in the consciousness-degraded state. The behavior of the vehicle corresponding to the steering operation of the driver is detected as an abnormal behavior to determine the consciousness-degraded state of the driver.

The low-level consciousness determination system 1 includes a white line recognition camera 10, a steering angle sensor 11, a warning device 20, and an electronic control unit [ECU] 30 (a curve inside/outside determination unit 31, a threshold value setting unit 32, an abnormal behavior presence/absence determination unit 33, and a warning control unit 34). In this embodiment, the curve inside/outside determination unit 31 corresponds to curved road determination means in the claims, the threshold value setting unit 32 corresponds to threshold value setting means in the claims, and the abnormal behavior presence/absence determination unit 33 corresponds to sudden steering detection means in the claims.

The white line recognition camera 10 is a camera sensor which recognizes a pair of left and right white lines forming a lane and includes a camera and a processing device. The camera is provided on the front side of the host vehicle and is attached such that the direction of the optical axis is aligned with the traveling direction of the host vehicle. The camera captures the image of a region including the road in front of the host vehicle at a predetermined time interval, acquires the captured image, and outputs image information to the processing device. The camera has a sufficiently wide imaging range to capture the left and right (a pair of) white lines forming a traveling lane in the left-right direction. The camera may be a color camera or a black-and-white camera.

The processing device recognizes a pair of left and right white lines forming the traveling lane of the host vehicle from the image whenever the image information is input from the camera. As the recognition method, for example, there is a method which performs edge processing since there is a large difference in brightness between a road surface and the white lines on the road surface. Then, for example, the processing device calculates, from the recognized pair of left and right white lines, the width of the lane, a line that passes through the center of the pair of left and right white lines, the radius or curvature of the curve of a center line of the lane or the white lines, the amount of offset (lateral position) of the host vehicle from the center of the lane, and the yaw angle (direction) of the host vehicle with respect to the center line of the lane. Then, the white line recognition camera 10 transmits the recognition result of the white lines or various kinds of calculated information as a white line recognition signal to the ECU 30 at a predetermined time interval. In this embodiment, the curvature has a positive value in the case of a right-hand curve and has a negative value in the case of a left-hand curve. The amount of offset is a positive value on the left side with respect to the center of the lane in the traveling direction and is a negative value on the right side with respect to the center of the lane in the traveling direction.

The steering angle sensor 11 is a sensor which detects the steering angle of a steering wheel input by the driver. The steering angle sensor 11 detects the steering angle at a predetermined time interval and transmits the detected steering angle as a steering angle signal to the ECU 30.

The warning device 20 is a device which outputs a warning for calling the driver's attention to the consciousness-degraded state to the driver. As a method for issuing the warning, for example, the following methods are used: a warning sound is output from a speaker; a warning screen is displayed on a display of a navigation system; a warning lamp in a combination meter is turned on; a seat vibration generation device vibrates a seat; and a steering wheel vibration generation device vibrates the steering wheel. When receiving a warning output signal from the ECU 30, the warning device 20 outputs a warning in response to the warning output signal.

The ECU 30 is an electronic control unit including, for example, a central processing unit [CPU], a read only memory [ROM], and a random access memory [RAM] and controls the overall operation of the low-level consciousness determination system 1. The ECU 30 loads an application program stored in the ROM to the RAM and executes the application program using the CPU to form the curve inside/outside determination unit 31, the threshold value setting unit 32, the abnormal behavior presence/absence determination unit 33, and the warning control unit 34. The ECU 30 receives each signal from the white line recognition camera 10 and the steering angle sensor 11 and the processing units 31, 32, 33, and 34 perform processing using the information of each signal. When it is determined that the driver is in the consciousness-degraded state (there is an abnormal behavior), the ECU 30 transmits the warning output signal to the warning device 20.

Whenever the steering angle sensor 11 acquires the steering angle, the ECU 30 calculates the steering angular speed using the current steering angle and a past steering angle (for example, the previous steering angle and a steering angle before the previous steering angle). When the driver inputs a sudden correction steering angle, a change in the steering angle per unit time is large and the steering angular speed increases.

The curve inside/outside determination unit 31 is a processing unit that determines an environment (a straight road, the outside of a curved road, and the inside of the curved road) in which the host vehicle is traveling. Specifically, the curve inside/outside determination unit 31 compares the curvature of the lane acquired from the white line recognition camera 10 and curved road determination threshold values (Th1, −Th1) and determines whether the road on which the host vehicle is traveling is a curved road or not (straight road). The curved road determination threshold values (Th1, −Th1) are used to determine whether the road is a curved road or a straight road using curvature and are preset. When the curvature is equal to or greater than Th1, the curve inside/outside determination unit 31 determines that the road is curved to the right. When the curvature is equal to or less than −Th1, the curve inside/outside determination unit 31 determines that the road is curved to the left. When the curvature is less than Th1 and is greater than −Th1, the curve inside/outside determination unit 31 determines that the road is a straight road (curve inside/outside determination is reset).

In addition, the curve inside/outside determination unit 31 determines whether the amount of offset from the center of the lane is equal to or greater than 0. In the case of the road curved to the right, the curve inside/outside determination unit 31 determines that the vehicle is traveling on the left side (outside) of the road curved to the right (curved road outside determination is established) when the amount of offset is equal to or greater than 0 and determines that the vehicle is traveling on the right side (inside) of the road curved to the right (curved road inside determination is established) when the amount of offset is less than 0. In the case of the road curved to the left, the curve inside/outside determination unit 31 determines that the vehicle is traveling on the left side (inside) of the road curved to the left when the amount of offset is equal to or greater than 0 (curved road inside determination is established) and determines that the vehicle is traveling on the right side (outside) of the road curved to the left when the amount of offset is less than 0 (curved road outside determination is established).

As described above, when the driver is in the consciousness-degraded state, in some cases, sudden correction steering occurs after the non-steering state as the abnormal behavior. As the sudden correction steering, steering for turning the vehicle along the curve is required in the case of the curved road. Therefore, the amount of correction steering required in the curved road is greater than that in the straight road. In addition, in the case of the outside of the curved road, the current steering is insufficient to turn the vehicle along the curve and a large amount of correction steering is required to return the vehicle to the center of the lane. In the case of the inside of the curved road, the current steering is too large to turn the vehicle along the curve and the amount of correction steering required to return the vehicle to the center of the lane may be less than that in the case of the outside of the curved road. Therefore, as the sudden correction steering after the non-steering state, the amount of sudden steering required for the vehicle which is traveling on the outside of the curved road is the largest, followed by the amount of sudden steering required for the vehicle which is traveling on the inside of the curved road and the amount of sudden steering required for the vehicle which is traveling on the straight road, and the steering angular speed increases with an increase in the amount of sudden steering.

The threshold value setting unit 32 is a processing unit that sets the sudden steering determination threshold value used by the abnormal behavior presence/absence determination unit 33. Specifically, the threshold value setting unit 32 sets TH_sv1 as the sudden steering determination threshold value of the steering angular speed when the vehicle is traveling on the outside of the curved road (when curve outside determination is established), sets TH_sv2 as the threshold value when the vehicle is traveling on the inside of the curved road (when curve inside determination is established), and sets TH_def as the threshold value when the vehicle is traveling on the straight road (when curve inside/outside determination is reset). As the sudden correction steering after the non-steering state, the amount of sudden steering required for the vehicle which is traveling on the outside of the curved road is the largest, followed by the amount of sudden steering required for the vehicle which is traveling on the inside of the curved road and the amount of sudden steering required for the vehicle which is traveling on the straight road. Therefore, TH_sv1>TH_sv2>TH_def is established among the threshold values.

TH_sv1, TH_sv2, and TH_def may be predetermined fixed values which are obtained by, for example, experiments in the actual vehicles or simulations. In addition, only TH_def may be predetermined and TH_sv1 and TH_sv2 may be variables. For example, it is assumed that TH_sv1 is proportional to the curvature of the lane from TH_def or is proportional to the yaw rate of the host vehicle (which is calculated from curvature and the speed of the vehicle or is detected by a yaw rate sensor). In addition, it is assumed that the ratio between TH_sv2 and TH_sv1 is a predetermined constant value, is a map which is proportional to the curvature, or is a map which is proportional to the yaw rate.

The abnormal behavior presence/absence determination unit 33 is a processing unit that determines whether there is an abnormal behavior as the behavior of the vehicle and determines that the driver is in the consciousness-degraded state when there is an abnormal behavior. Specifically, the abnormal behavior presence/absence determination unit 33 determines whether there is an abnormal behavior (sudden steering is detected after the non-steering state is detected), on the basis of the steering angular speed which is calculated at a predetermined time interval and the sudden steering determination threshold value which is set by the threshold value setting unit 32. The method according to the related art is applied as a method for determining whether there is an abnormal behavior. For example, this method determines whether a state in which the steering angular speed is equal to or less than a non-steering determination threshold value is maintained for a time that is equal to or greater than a non-steering duration determination threshold value and then determines whether the steering angular speed is equal to or greater than the sudden steering determination threshold value after this condition is satisfied. The non-steering determination threshold value is a threshold value for determining whether steering is not performed or a change in steering is small on the basis of the steering angular speed. The non-steering duration determination threshold value is a threshold value for determining a duration for which it is sufficiently determined that the steering state of the driver is a non-steering state or a state in which the amount of steering is small. When determining that there is an abnormal behavior, the abnormal behavior presence/absence determination unit 33 determines that the driver is in the consciousness-degraded state and turns on a consciousness degradation flag. The consciousness degradation flag is an on/off flag, is turned on when the driver is in the consciousness-degraded state, and is turned off when the driver is in a normal state.

The warning control unit 34 is a processing unit for outputting a warning when the abnormal behavior presence/absence determination unit 33 determines that the driver is in the consciousness-degraded state. Specifically, when the abnormal behavior presence/absence determination unit 33 determines that the driver is in the consciousness-degraded state (the consciousness degradation flag is turned on), the warning control unit 34 transmits a warning output signal for outputting a warning to the warning device 20.

Figure 2:
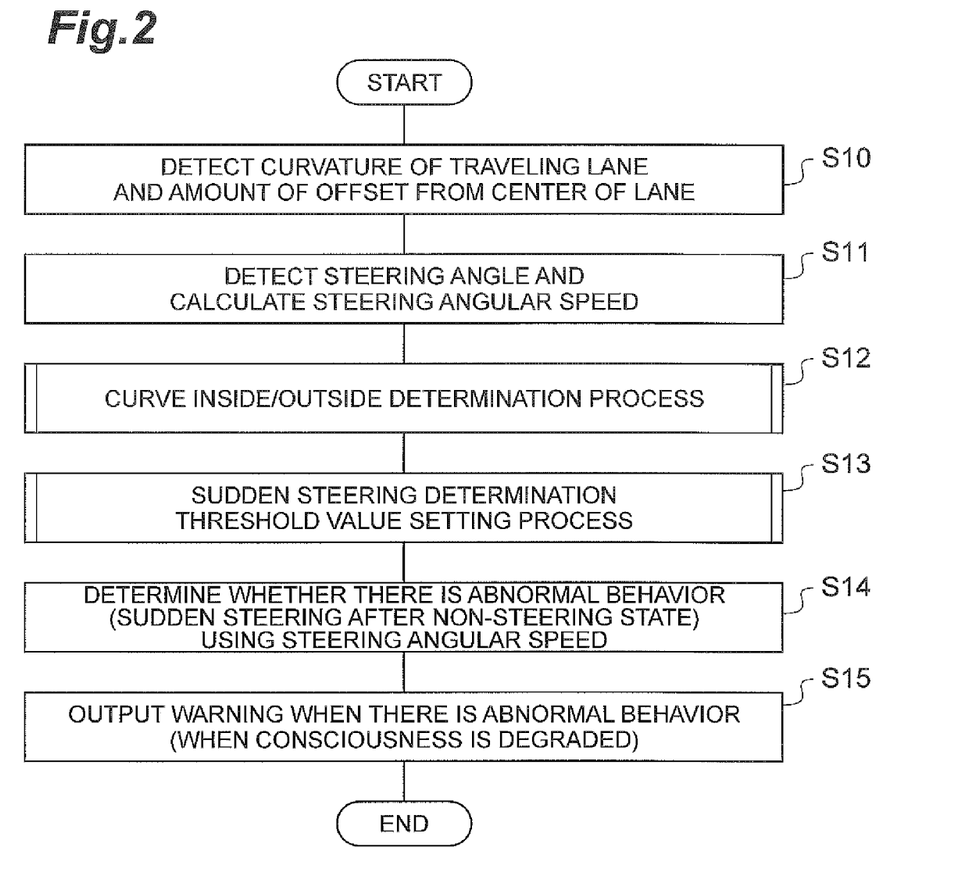
FIG. 2 is a flowchart illustrating the flow of a main operation of the low-level consciousness determination system according to this embodiment.
Figure 3:
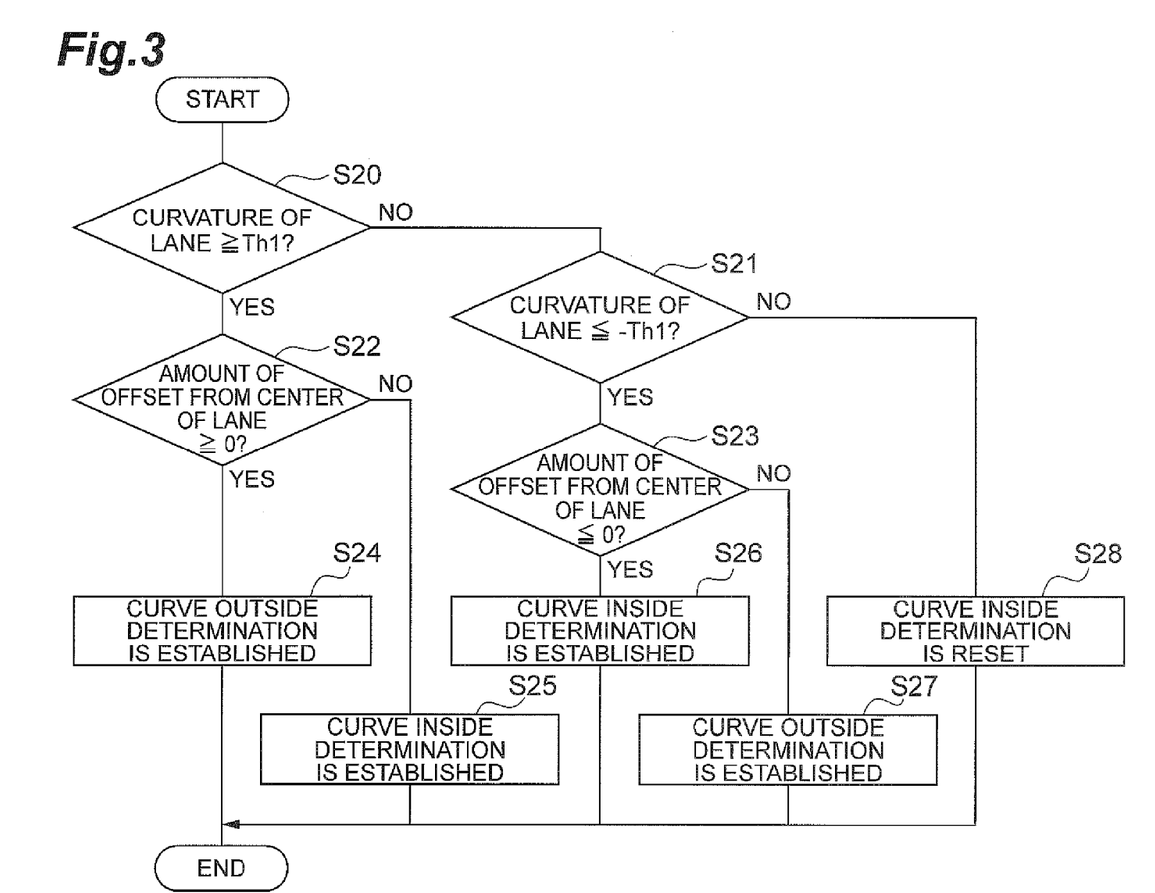
FIG. 3 is a flowchart illustrating the flow of a curve inside/outside determination process in the flowchart illustrating the main operation of FIG. 2.
Figure 4:
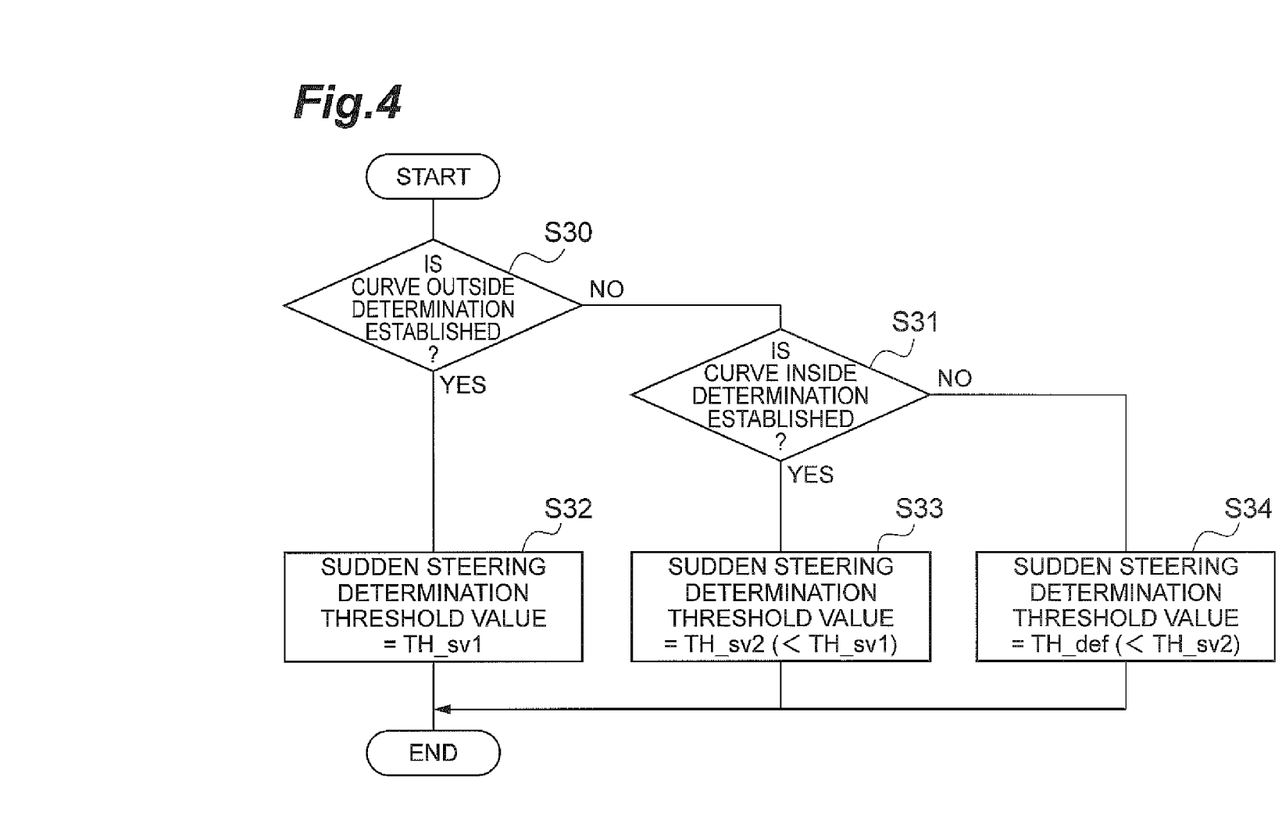
FIG. 4 is a flowchart illustrating the flow of a threshold value setting process in the flowchart illustrating the main operation of FIG. 2.

The operation of the low-level consciousness determination system 1 will be described with reference to FIG. 1. In particular, the overall operation will be described with reference to the flowchart illustrated in FIG. 2, a curve inside/outside determination process will be described with reference to the flowchart illustrated in FIG. 3, and a threshold value setting process will be described with reference to the flowchart illustrated in FIG. 4. FIG. 2 is the flowchart illustrating the flow of the main operation of the low-level consciousness determination system. FIG. 3 is the flowchart illustrating the flow of the curve inside/outside determination process in the flowchart illustrating the main operation. FIG. 4 is a flowchart illustrating the flow of the threshold value setting process in the flowchart illustrating the main operation. The low-level consciousness determination system 1 repeatedly performs the following operation at a predetermined time interval while working.

The white line recognition camera 10 captures the image of a region including the road in front of the host vehicle. Then, the white line recognition camera 10 recognizes a pair of left and right white lines indicating the traveling lane of the host vehicle from the captured image and calculates, from the pair of left and right white lines, the width of the lane, a center line of the pair of left and right white lines, the radius or curvature of a curve, the amount of offset from the center of the lane, and a yaw angle with respect to a center line of the lane (S10). Then, the white line recognition camera 10 transmits the recognition result of the white lines or various kinds of calculated information as the white line recognition signal to the ECU 30. The ECU 30 receives the white line recognition signal and acquires the recognition result of the white lines or various kinds of information.

The steering angle sensor 11 detects the steering angle and transmits the detected steering angle as the steering angle signal to the ECU 30 (S11). The ECU 30 receives the steering angle signal, acquires the steering angle, and calculates a steering angular speed (S11).

The ECU 30 performs the curve inside/outside determination process (S12). First, the ECU 30 determines whether the curvature of the lane is equal to or greater than Th1 (S20). When it is determined in S20 that the curvature of the lane is less than Th1, the ECU 30 determines whether the curvature of the lane is equal to or less than −Th1 (S21). When it is determined in S21 that the curvature of the lane is greater than −Th1, the ECU 30 resets the curve inside/outside determination (S28).

When it is determined in S20 that the curvature of the lane is equal to or greater than Th1, the ECU 30 determines whether the amount of offset from the center of the lane is equal to or greater than 0 (S22). When it is determined in S22 that the amount of offset from the center of the lane is equal to or greater than 0 (when the host vehicle is traveling on the left side with respect to the center of the lane on a right-hand curve), curve outside determination is established in the ECU 30 (S24). When it is determined in S22 that the amount of offset from the center of the lane is less than 0 (when the host vehicle is traveling on the right side with respect to the center of the lane on the right-hand curve), curve inside determination is established in the ECU 30 (S25).

When it is determined in S21 that the curvature of the lane is equal to or less than −Th1, the ECU 30 determines whether the amount of offset from the center of the lane is equal to or greater than 0 (S23). When it is determined in S23 that the amount of offset from the center of the lane is equal to or greater than 0 (when the host vehicle is traveling on the left side with respect to the center of the lane on a left-hand curve), curve inside determination is established in the ECU 30 (S26). When it is determined in S23 that the amount of offset from the center of the lane is less than 0 (when the host vehicle is traveling on the right side with respect to the center of the lane on the left-hand curve), curve outside determination is established in the ECU 30 (S27).

Then, the ECU 30 performs a sudden steering determination threshold value setting process (S13). First, the ECU 30 determines whether curve outside determination is established (S30). When it is determined in S30 that curve outside determination is not established, the ECU 30 determines whether curve inside determination is established (S31). When it is determined in S31 that curve inside determination is not established (when the vehicle is traveling on a straight road), the ECU 30 sets a default value TH_def (minimum threshold value) as the sudden steering determination threshold value (S34).

When it is determined in S30 that curve outside determination is established, (when the vehicle is traveling on the outside of the curved road), the ECU 30 sets a value TH_sv1 (maximum threshold value) for the outside of the curved road as the sudden steering determination threshold value (S32). On the other hand, when it is determined in S31 that curve inside determination is established (when the vehicle is traveling on the inside of the curved road), the ECU 30 sets a value TH_sv2 (a value smaller than the value for the outside of the curved road) for the inside of the curved road as the sudden steering determination threshold value (S33).

Then, the ECU 30 determines whether there is an abnormal behavior (sudden steering after the non-steering state) using the steering angular speed (S14). At that time, the sudden steering determination threshold value which is set in S13 is used to determine sudden steering. When determining that there is an abnormal behavior, the ECU 30 determines that the driver is in the consciousness-degraded state (turns on the consciousness degradation flag) and transmits the warning output signal to the warning device 20 (S15).

When receiving the warning output signal, the warning device 20 outputs a warning (S15). The driver can recognize the degradation of consciousness from the warning and makes an appropriate response, such as a rest, if necessary.

According to the low-level consciousness determination system 1, since the sudden steering determination threshold value is changed when the vehicle is traveling on the outside of the curved road, when the vehicle is traveling on the inside of the curved road, and when the vehicle is traveling on the straight road, it is possible to determine (detect) sudden steering after the non-steering state with high accuracy and to determine the consciousness-degraded state of the driver with high accuracy. In particular, according to the low-level consciousness determination system 1, when the vehicle is traveling on the curved road, the sudden steering determination threshold value is set to be greater than that when the vehicle is traveling on the straight road. In addition, when the vehicle is traveling on the outside of the curved road, the sudden steering determination threshold value is set to be greater than that when the vehicle is traveling on the inside of the curved road. Therefore, it is possible to determine sudden steering with high accuracy, on the basis of the threshold values suitable for each traveling environment.

The embodiment of the invention has been described above. However, the invention is not limited to the above-described embodiment and various modifications and changes of the invention can be made.

For example, in this embodiment, the invention is applied to the low-level consciousness determination system which determines that the driver is in the consciousness-degraded state when it is determined that there is an abnormal behavior and outputs a warning when the driver is in the consciousness-degraded state. However, the information (consciousness degradation flag) of the consciousness-degraded state (information about whether there is an abnormal behavior) may be used by other systems, such as an air suspension control system, a lane keeping assist system, a tire pressure warning system, and a misalignment warning system.

In this embodiment, the low-level consciousness determination system is provided with the ECU and the ECU performs the curve inside/outside determination process, the threshold value setting process, the abnormal behavior presence/absence determination process, and the warning control process. However, the processing device in the white line recognition camera may perform these processes.

In this embodiment, the non-steering state or sudden steering is determined using the steering angular speed. However, it may be determined using other parameters, such as a steering angle, steering torque, an integrated value of the steering torque, a yaw rate, and horizontal gravitational force.

In this embodiment, it is determined whether the road is a straight road or a curved road using curvature. However, it may be determined whether the road is a straight road or a curved road using other parameters, such as the radius of a curve, or map data. In addition, it is determined whether the vehicle is traveling on the outside of the curved road or on the inside of the curved road using the amount of offset from the center of the lane. However, it may be determined whether the vehicle is traveling on the outside of the curved road or on the inside of the curved road using other parameters, such as the positional information of the host vehicle obtained by a high-accuracy GPS.

In this embodiment, the sudden steering determination threshold values are set according to three traveling environments, such as the outside of the curved road, the inside of the curved road, and the straight road. However, the outside of the curved road and the inside of the curved road each may be divided into a plurality of stages and the threshold values may be set according to the divided stages. For example, in the case of the outside of the curved road, a larger threshold value is set as the distance from the lane to the outside increases.

In this embodiment, the traveling environment on the curved road is determined only by the amount of offset from the center of the lane. However, the traveling environment on the curved road may be determined by the yaw angle in addition to the amount of offset. For example, when it is determined that the host vehicle is disposed on the outside of the curved road on the basis of the amount of offset, it is determined whether the vehicle travels to the outside of the curve or the inside of the curve on the basis of the yaw angle. When the vehicle travels to the outside of the curve, a threshold value that is greater than that when the vehicle travels to the inside of the curve is set.

In this embodiment, it is determined whether the road is a curved road. When the road is a curved road, it is determined whether the vehicle is traveling on the outside of the curved road or on the inside of the curved road. However, only whether the road is a curved road or not (straight road) may be determined. For example, in the flowchart illustrated in FIG. 3, S20 and S21 are performed to determine the curvature of the lane and it is determined whether "−Th1<the curvature of the lane <Th1?" is satisfied. When the determination result is "YES", the road is determined not to be a curved road (to be a straight road). When the determination result is "NO", the road is determined to be a curved road. When the road is determined to be a curved road, the sudden steering determination threshold value is set to be greater than that when the road is determined not to be a curved road.

INDUSTRIAL APPLICABILITY

The invention can be applied to a low-level consciousness determination system which detects sudden steering after a non-steering state and determines the consciousness-degraded state of the driver who drives the vehicle.

REFERENCE SIGNS LIST

1: LOW-LEVEL CONSCIOUSNESS DETERMINATION SYSTEM
10: WHITE LINE RECOGNITION CAMERA
11: STEERING ANGLE SENSOR
20: WARNING DEVICE
30: ECU
31: CURVE INSIDE/OUTSIDE DETERMINATION UNIT
32: THRESHOLD VALUE SETTING UNIT
33: ABNORMAL BEHAVIOR PRESENCE/ABSENCE DETERMINATION UNIT
34: WARNING CONTROL UNIT

The invention claimed is:

1. A low-level consciousness determination system that detects sudden steering after a non-steering state and determines a consciousness-degraded state of a driver who drives a vehicle, comprising:
curved road determination means for determining whether the vehicle is traveling on the outside of a curved road or the inside of the curved road when a road on which the vehicle is traveling is the curved road;
threshold value setting means for setting different sudden steering determination threshold values when the curved road determination means determines that the vehicle is traveling on the outside of the curved road and when the curved road determination means determines that the vehicle is traveling on the inside of the curved road; and
sudden steering detection means for detecting the sudden steering on the basis of the threshold values set by the threshold value setting means after the non-steering state is detected.

2. The low-level consciousness determination system according to claim 1,
wherein, when the vehicle is traveling on the outside of the curved road, the threshold value setting means sets the sudden steering determination threshold value to be greater than that when the vehicle is traveling on the inside of the curved road.

3. A low-level consciousness determination system that detects sudden steering after a non-steering state and determines a consciousness-degraded state of a driver who drives a vehicle, comprising:
curved road determination means for determining whether a road on which the vehicle is traveling is a curved road;
threshold value setting means for setting different sudden steering determination threshold values when the curved road determination means determines that the road is not the curved road and when the curved road determination means determines that the road is the curved road; and
sudden steering detection means for detecting the sudden steering on the basis of the threshold values set by the threshold value setting means after the non-steering state is detected.

4. The low-level consciousness determination system according to claim 3,
wherein, when the vehicle is traveling on the curved road, the threshold value setting means sets the sudden steering determination threshold value to be greater than that when the vehicle is not traveling on the curved road.

5. A low-level consciousness determination system that detects sudden steering after a non-steering state and determines a consciousness-degraded state of a driver who drives a vehicle, comprising:
curved road determination means for determining whether a road on which the vehicle is traveling is a curved road and determining whether the vehicle is traveling on the outside of the curved road or on the inside of the curved road when the road is the curved road;
threshold value setting means for setting different sudden steering determination threshold values when the curved road determination means determines that the road is not the curved road, when the curved road determination means determines that the vehicle is traveling on the outside of the curved road, and when the curved road determination means determines that the vehicle is traveling on the inside of the curved road; and
sudden steering detection means for detecting the sudden steering on the basis of the threshold values set by the threshold value setting means after the non-steering state is detected.

* * * * *